(12) United States Patent
White

(10) Patent No.: US 10,547,750 B2
(45) Date of Patent: Jan. 28, 2020

(54) PROMOTION EVALUATION BASED ON MOBILE DEVICE IDENTIFIERS

(71) Applicant: T-Mobile USA, Inc., Bellevue, WA (US)

(72) Inventor: Benjamin Zachary White, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 15 days.

(21) Appl. No.: 16/016,213

(22) Filed: Jun. 22, 2018

(65) Prior Publication Data

US 2018/0376005 A1 Dec. 27, 2018

Related U.S. Application Data

(60) Provisional application No. 62/523,681, filed on Jun. 22, 2017.

(51) Int. Cl.
*H04M 15/00* (2006.01)
*H04W 8/20* (2009.01)
*H04W 4/24* (2018.01)

(52) U.S. Cl.
CPC ......... *H04M 15/51* (2013.01); *H04M 15/68* (2013.01); *H04M 15/8083* (2013.01); *H04W 4/24* (2013.01); *H04W 8/20* (2013.01)

(58) Field of Classification Search
CPC .. H04M 15/51; H04M 15/68; H04M 15/8083; H04W 4/24; H04W 8/20

USPC ......................................................... 455/406
See application file for complete search history.

(56) References Cited

U.S. PATENT DOCUMENTS

| | | | | |
|---|---|---|---|---|
| 7,072,848 B2* | 7/2006 | Boyd | ..................... | G06Q 30/02 705/14.1 |
| 8,799,208 B2* | 8/2014 | Brierley | ................. | G06Q 30/02 705/7.32 |
| 9,773,257 B1* | 9/2017 | Bodell | ............... | G06Q 30/0251 |
| 2004/0097245 A1* | 5/2004 | Sheth | .................... | G06Q 30/02 455/466 |

* cited by examiner

*Primary Examiner* — Shahriar Behnamian
(74) *Attorney, Agent, or Firm* — Knobbe, Martens, Olson & Bear, LLP

(57) ABSTRACT

Systems, methods, and computer-readable media are described for generating customized service plans for a wireless telecommunications network. An operator of a wireless telecommunications network may allow users to access the network in accordance with a service plan, which may specify terms and conditions associated with usage of the network (e.g., types of usage, amounts of usage, geographic areas, associated mobile devices and users, subscription fees, etc.). Customized, user-specific service plans for the wireless network may be generated and implemented by determining that a user satisfies one or more criteria for applying service plan modifications. A user may be required to agree to specified conditions, such as upgrading a mobile device or subscribing for a specified time period, in order to accept a customized service plan. Multiple modifications may be applied to a base service plan, and plans and/or modifications for which the user is eligible may be identified.

20 Claims, 5 Drawing Sheets

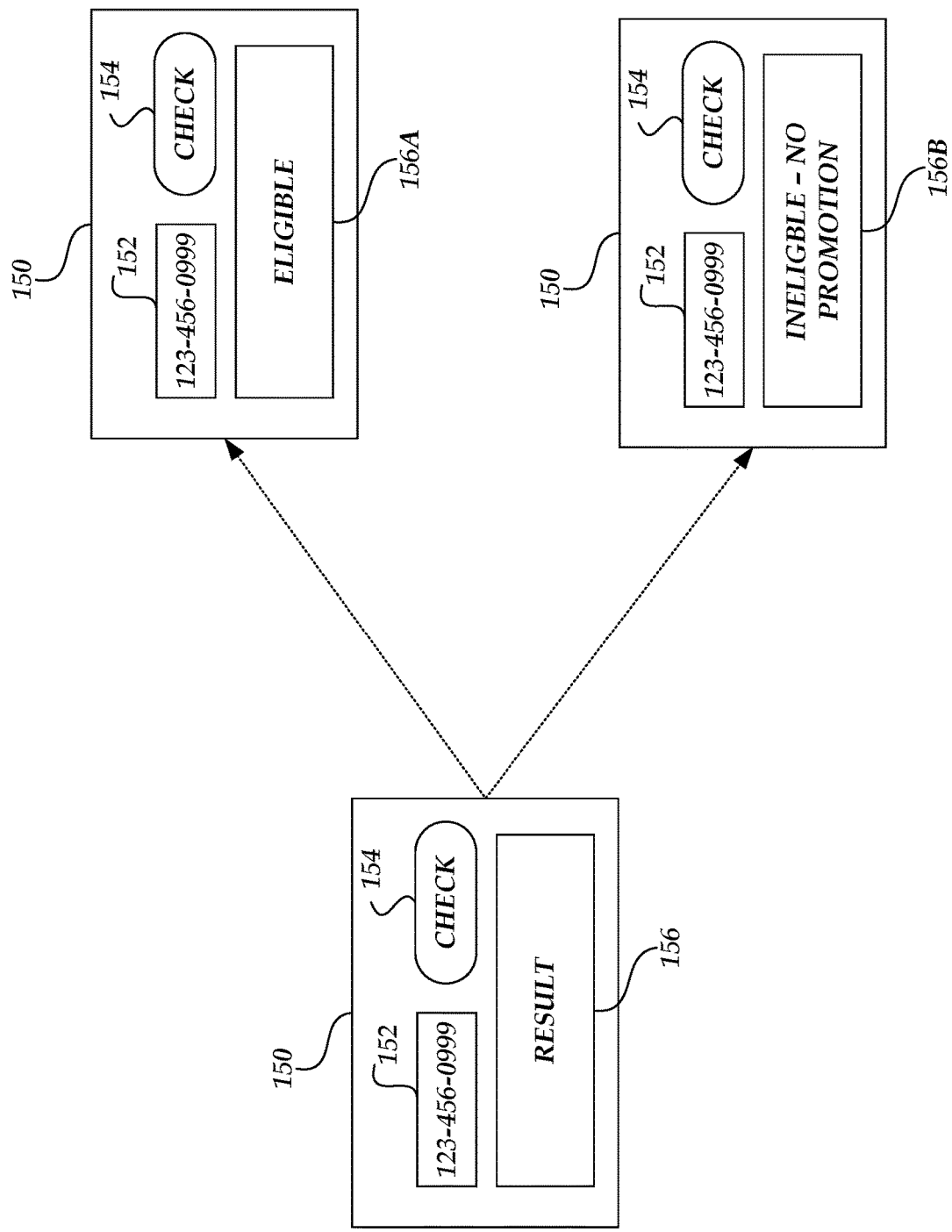

PROMOTION EVALUATION BASED ON MOBILE DEVICE IDENTIFIERS

BACKGROUND

Generally described, computing devices can be used to exchange information via a network. Mobile computing devices may utilize a network provided by a wireless service provider to facilitate the exchange of information in accordance with one or more wireless communication protocols. For example, a wireless service provider may maintain a wireless network that enables mobile computing devices to exchange information in accordance with a wireless telecommunications protocol. The wireless network may cover an area spanning multiple geographic locations, and thereby enable the exchange of information with mobile computing devices in the covered locations.

Wireless service providers may thus make wireless telecommunications services (e.g., exchange of information with mobile computing devices) and associated products (e.g., mobile computing devices) available to users or potential users in a variety of geographic locations. Wireless service providers may provide facilities, such as retail stores, that allow potential users to subscribe to wireless telecommunications services, allow existing users to change their subscriptions, or facilitate other interactions. These facilities may be located at particular geographic locations, which may coincide with the locations of the users and the areas covered by the wireless network.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 1A-1B are pictorial drawings of example user interfaces presented by a promotion eligibility service in accordance with aspects of the present disclosure.

DETAILED DESCRIPTION

Figure 1A:
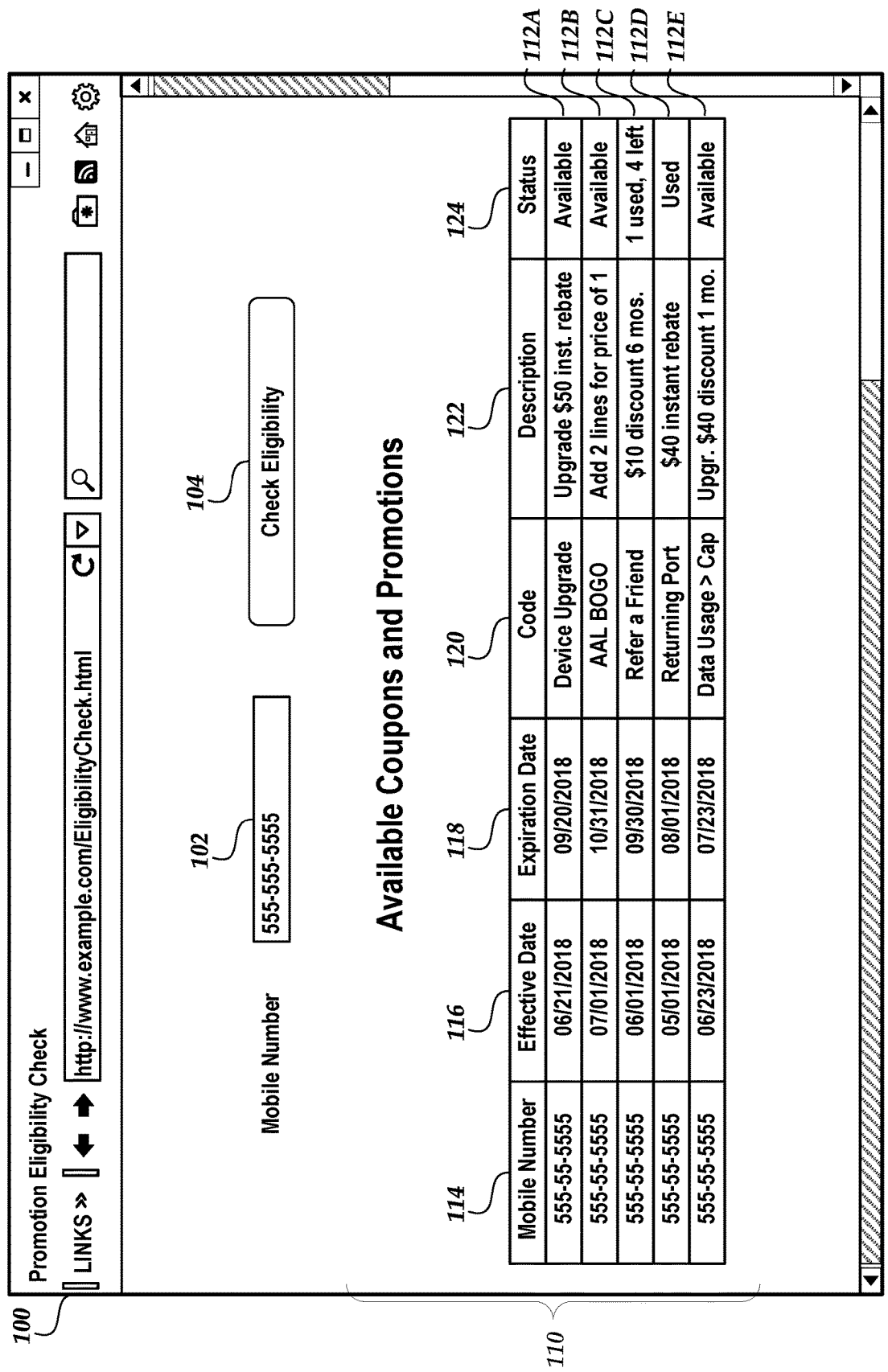

Generally described, aspects of the present disclosure relate to managing the distribution of information related to customers of wireless telecommunications services. More specifically, aspects of the present disclosure are directed to systems, methods, and computer-readable media related to determine various customer attributes in order to determine qualifications for programs and products related to the wireless telecommunications services. Illustratively, retail agents or other staff at wireless service provider retail stores interact with existing or potential customers that wish to modify existing service agreements or purchase additional services or products. Often, such activities may be associated with promotions, such as offers or discounts provided by the wireless service provider.

In some embodiments, customers or potential customers can redeem promotions for products or services that relate to receiving discounted or free merchandise based on transferring or switching accounts associated with different wireless service providers. More specifically, in some scenarios, wireless service providers can offer promotions (e.g., discounts, rebates, etc.) related to switching accounts with wireless service providers while retaining the Mobile Directory Number ("MDN") or wireless phone number, which may be referred to herein as "porting in" or "porting out." For example, assume a customer has current service (including an MDN) with a first wireless service provider. A second wireless service provider may offer promotions to cause the customer to request a switch of wireless service to the second wireless service provider while retaining the customer's MDN (e.g., porting out the MDN). Still further, in some scenarios, wireless service providers can often attempt to regain customers by offering additional promotions to request a second MDN transfer back to the wireless service provider within a defined time window. With reference to the previous example, if the customer accepts the offer from the second wireless service provider, the first wireless service provider may subsequently generate offers to incentivize a return to service or indicate that such a return to the first wireless service provider may be achieved without incurring fees or penalties.

Both of the above examples illustrate accepted and common practices that wireless service providers implement in some wireless service marketplaces. In that regard, it is generally accepted that wireless service providers will offer promotions to incentivize MDN transfers from other wireless service providers and that the same wireless service providers will offer promotions to incentivize subsequent MDN returns. Such promotions or incentives may include, for example, one-time discounts, discounts for a specified number of billing periods, increasing or decreasing an amount of usage in a service plan, adding a user to a service plan, adding a mobile computing device to a service plan, upgrading or replacing a mobile computing device associated with a service plan, increasing or decreasing a bandwidth associated with a service plan, and the like.

In some scenarios, customers can leverage the promotion dynamic between wireless service provides to obtain improper benefits or unintended gains. For example, a customer may repeatedly engage in MDN transfers and returns with multiple wireless service providers to redeem promotions, such as offers for free or discounted mobile devices. With reference to the previous example, a "fraudulent" customer of the first wireless service may engage in repeated MDN transfers and returns with other wireless service providers to gain the benefits of the promotions offered by the additional service providers to initiate the MDN transfer, gain the benefits of the promotions offered by the first wireless service to initiate the MDN return, or both.

In accordance with aspects of the present application, a wireless service provider can maintain systems and methods for managing promotions and offers made to existing or potential customers. More specifically, the wireless service provider can provide an interface that can be provided to various retail locations and accessed via a network connection. The interface may be used by the various retail locations to determine an existing or potential customer's eligibility for various promotional offers. Eligibility for a particular offer may be determined according to rules specified by the wireless service provider. For example, a wireless service provider may specify that customers who port in a particular MDN, as described above, are eligible for a promotion if they have not previously ported in the same MDN, or have not previously ported in the same MDN within a specified time period or time thresholds (e.g., the past twelve months).

In additional embodiments, a wireless service provider can further associate additional or alternative promotions related to modifications of existing service plans as part of the inquiry related to eligibility for particular offers related to MDN transfer. For example, a wireless service provider may specify that customers who exceed a monthly usage cap on their data service plan for two consecutive months are eligible for a promotional discount on a next-tier data service plan. As still further examples, a wireless service provider may specify that customers using older mobile devices are eligible for an instant rebate when upgrading to a newer device, that customers within a particular geographic region are eligible for a promotional rate on certain products or services, that customers are eligible for a "buy one, get one free" ("BOGO") offer when purchasing a particular product or service, or may specify other rules for determining eligibility.

In some embodiments, a promotion eligibility system may generate customized promotions or coupons for individual customers based on rules specified by the wireless service provider. For example, the promotion eligibility system may identify a number of promotions for which a particular customer is eligible, and may combine these promotions to generate a customer-specific offer. In further embodiments, the promotion eligibility system may determine relationships between multiple promotions. For example, the system may determine that a discount on a high-speed data plan will only be offered in conjunction with a device upgrade offer, or that a longer-term discount takes precedence over a short-term discount.

In some embodiments, as described in more detail below, the promotion eligibility system may utilize information from a number porting system to determine eligibility for promotional offers and prevent abuse of number porting incentives. A number porting system may provide, for example, information regarding an MDN that has been ported from one wireless service provider to another, such as the date of the most recent MDN transfer. In some embodiments, the number porting system may provide, or the promotion eligibility system may determine, a service provider ID ("SPID") associated with the wireless service provider from which an MDN is transferred, and may determine eligibility for promotional offers based on the SPID.

In other embodiments, the promotion eligibility system may obtain or determine information regarding the original source of the MDN. For example, a first wireless service provider may be assigned or associated with a "number pool," which may include a range of MDNs (e.g., all MDNs that match the pattern 425-555-####, where "#" represents any digit). The promotion eligibility system may thus determine that the MDN "425-555-3459" was originally associated with the first wireless service provider, and then further determine that the MDN was ported to a second wireless service provider based on information obtained from the number porting system. The promotion eligibility system may therefore determine that the MDN is transferred frequently, and is potentially associated with abuse of number porting incentives.

In some embodiments, the promotion eligibility system may generate or be integrated into user interfaces, such as user interfaces utilized by retail stores to allow customers to obtain or change wireless services. The promotion eligibility system may thus be used to filter information regarding a particular MDN, such that only information relevant to obtaining and changing wireless services (e.g., eligibility for promotions relating to the wireless services) is presented. The promotion eligibility system may similarly provide information regarding promotion eligibility without providing the information upon which such determinations are made. For example, the promotion eligibility system may indicate whether a particular MDN is eligible for a promotional offer without indicating the frequency of MDN transfers or other information that the system can associate with the MDN.

The terms "user," "client," and "customer" may be used interchangeably herein to refer to any individual or entity that uses or requests access to wireless telecommunications services provided by a wireless service provider, or who may potentially use or request access to these services (e.g., potential users or customers). The term "subscriber" may similarly be used to refer to any individual or entity that uses or requests access via a subscription-based service plan. It will be thus understood that subscribers may also be customers, clients, or users, and vice versa, and that the terms may inclusively refer to those who may potentially access wireless networks and services as well as those who currently access these networks and services. It will thus be understood that the embodiments described herein are not limited to any particular type or classification of users or potential users, or to any type or classification of provided services.

It will be understood that the promotion eligibility service described herein addresses a technical problem that specifically arises in the realm of computer networks, and in particular addresses a problem that arises in the realm of wireless telecommunications networks. It will further be understood that the technical problem described herein is not analogous to any pre-Internet practice, and that the promotion eligibility service improves the performance of a wireless telecommunications network by, for example, presenting retail stores and other facilities with relevant and timely information to prevent misuse of MDN transfers. By implementing the promotion eligibility service, a wireless service provider may thus make more effective use of the provider's wireless network and provide wireless telecommunications services more efficiently.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of this disclosure may include several novel features, no single one of which is solely responsible for its desirable attributes or which is essential to practicing the embodiments of the disclosure herein described.

FIG. 1A is a pictorial drawing of an example user interface 100 that may be presented by a promotion eligibility service in accordance with aspects of the present disclosure. The example user interface 100 includes an MDN input field 102, which enables user entry of an MDN or other identifier, and a check eligibility button 104. The user interface 100 can access a customer eligibility service that utilizes information indexed according to an identifier, such as the MDN. Based on the MDN, the promotion eligibility service can determine whether the customer (or customers) associated with the MDN are eligible for various promotions. For example, a specified MDN may have been part of a promotion redemption in a defined time window and a number of such promotions that have been redeemed over the defined time window. The promotion eligibility service can further determine whether the customer has been associated with other wireless service providers or wireless service provider programs over a defined time window. The promotion eligibility service can further identify a tenure in which the customer has been a customer or potential customer.

In one embodiment, the promotion eligibility service can implement various processing rules to evaluate the information and determine whether the customer or potential customer should be offered a promotion. In this regard, the promotion eligibility service can make an assessment of the likelihood that a fraudulent redemption may take place and generate a response associated with such an assessment. In one example, the rules can utilize thresholds, such as a maximum number of allowable MDN transfer within a time window. In another example, the promotion eligibility service can utilize multiple information to make an assessment. For example, the promotion eligibility service can utilize a combination of MDN transfers and other wireless service provider associations in combination. In still a further example, the promotion eligibility service can utilize weighting factors in making assessments, such as providing a weighing factors toward specific wireless service providers, types of equipment included in the promotion, types of requested wireless service plans (e.g., pre-paid plans vs. monthly revolving account plans), and the like. The outcome of the likelihood can be expressed in terms a mathematical number (relative or absolute), a predefined class (e.g., high, medium, low) and the like.

The promotion eligibility service can further implement multiple rules and make comparisons/assessments regarding the assessments from individual rules. For example, the promotion eligibility service can utilize additional rules/ weighing factors, such as requiring at least two rules to indicate a likelihood of a fraudulent redemption, calculating a cumulative score based on multiple assessment scores, a selection of the highest identified class, etc.

Using the determination of the likelihood of a fraudulent assessment, the promotion eligibility service can then return information to the retail store regarding the assessment. The information may illustratively be displayed in the form of a table 110, which may contain information regarding various promotions 112A-E that the customer(s) associated with the MDN are eligible to receive. The information may include, for example, MDN(s) 114, effective dates 116, expiration dates 118, promotion codes 120, promotion descriptions 122, and promotion statuses 124.

In some embodiments, the table 110 may include information regarding promotions that the customer is ineligible to receive. For example, in the illustrated embodiment, the MDN 555-555-5555 is not eligible to receive the $40 instant rebate promotion 112D because this promotion has already been used in association with this MDN, as indicated by the promotion 112D's entry in the status column 124. In some embodiments, the status column 124 may include time information, such as a time or times at which a particular promotion was redeemed. As a further example, the table 110 may include information regarding promotions that the customer was not eligible to receive because the customer did not satisfy one or more eligibility criteria. For example, the table 110 may indicate that a customer is currently ineligible for a loyalty discount (e.g., because they have not been a customer for a sufficient length of time), but will become eligible at a specified later time. In other embodiments, the table 110 may indicate whether the customer is eligible or ineligible for a particular promotion, such as a promotional offer associated with porting in the MDN.

Advantageously, a retail operator can access the user interface 100 while interacting with the customer or potential customer and mitigate potential fraudulent transactions. Additionally, the retail operator can be further provided with additional details that allow for adjustments to the promotions or require additional information from the customer or potential customer. For example, the user interface 100 may indicate that the customer would be eligible for a "Refer a Friend" promotion 112C if the customer provides additional information regarding another potential customer. In some embodiments, the promotions 112A-E may be selectable, and selecting a promotion 112A-E may cause display of a second user interface for collecting additional information. For example, selecting the promotion 112C may cause display of a user interface that collects information regarding the referral, or selecting the device upgrade promotion 112A may cause display of a user interface for selecting a new mobile device.

FIG. 1B is a pictorial drawing of another example user interface 150 presented by a promotion eligibility service in accordance with aspects of the present disclosure. The example user interface 150 specifically is a limited interface in which customer eligibility can be requested and a determination of eligibility can be provided without requiring the disclosure of information, such as historical transaction information or account information, in the interface 150. Interface 150 may be applicable in embodiments in which a computing device generating the interface may correspond to public kiosks or point of sale terminals in which the disclosure of transactional information or historical account information is not allowed or in which a wireless service provider is attempting to generate an indication of eligibility or available promotions without disclosing at least a portion of the information utilized to make such a determination.

Interface 150 illustratively includes an MDN input field 152, which enables user entry of an MDN or other identifier, and a check eligibility button 104. The user interface 100 can access a customer eligibility service that utilizes information indexed according to an identifier, such as the MDN. Based on the MDN, the promotion eligibility service can determine whether the customer (or customers) associated with the MDN are eligible for various promotions. For example, a specified MDN may have been part of a promotion redemption in a defined time window and a number of such promotions that have been redeemed over the defined time window. The promotion eligibility service can further determine whether the customer has been associated with other wireless service providers or wireless service provider programs over a defined time window. The promotion eligibility service can further identify a tenure in which the customer has been a customer or potential customer. The interface 150 includes a control 154 for allowing the submission of the entered MDN.

As illustrated in FIG. 1B, the interface 150 includes a field 156 for communicating the results of the eligibility determination or offer of additional promotions. For example, field 156A illustrates an example in which an MDN number is determined to be eligible. Field 156A can also include a description of eligible promotions or a confirmation of the terms of an identified promotion. In contrast, field 156B illustrates an example in which an MDN number is determined to non-eligible for either a transfer or a promotion. Field 156B can also provide additional instructions regarding how the determination of non-eligibility should be processed, such as offering alternative promotions or language for communicating the determination of eligibility.

In various embodiments, the illustrated user interfaces 100 and 150 may include more or fewer elements than those depicted above. For example, in interface 100, the MDN column 114 or the effective date column 116 may be omitted. As a further example, the user interface 100 may include checkboxes or other selectors for the promotions 112A-E, and may display a summary of the selected promotions 112A-E to indicate the combined effect of the selected promotions. Thus, the depicted user interfaces 100 and 150 are understood to be provided for purposes of example and is not limiting.

Figure 2:
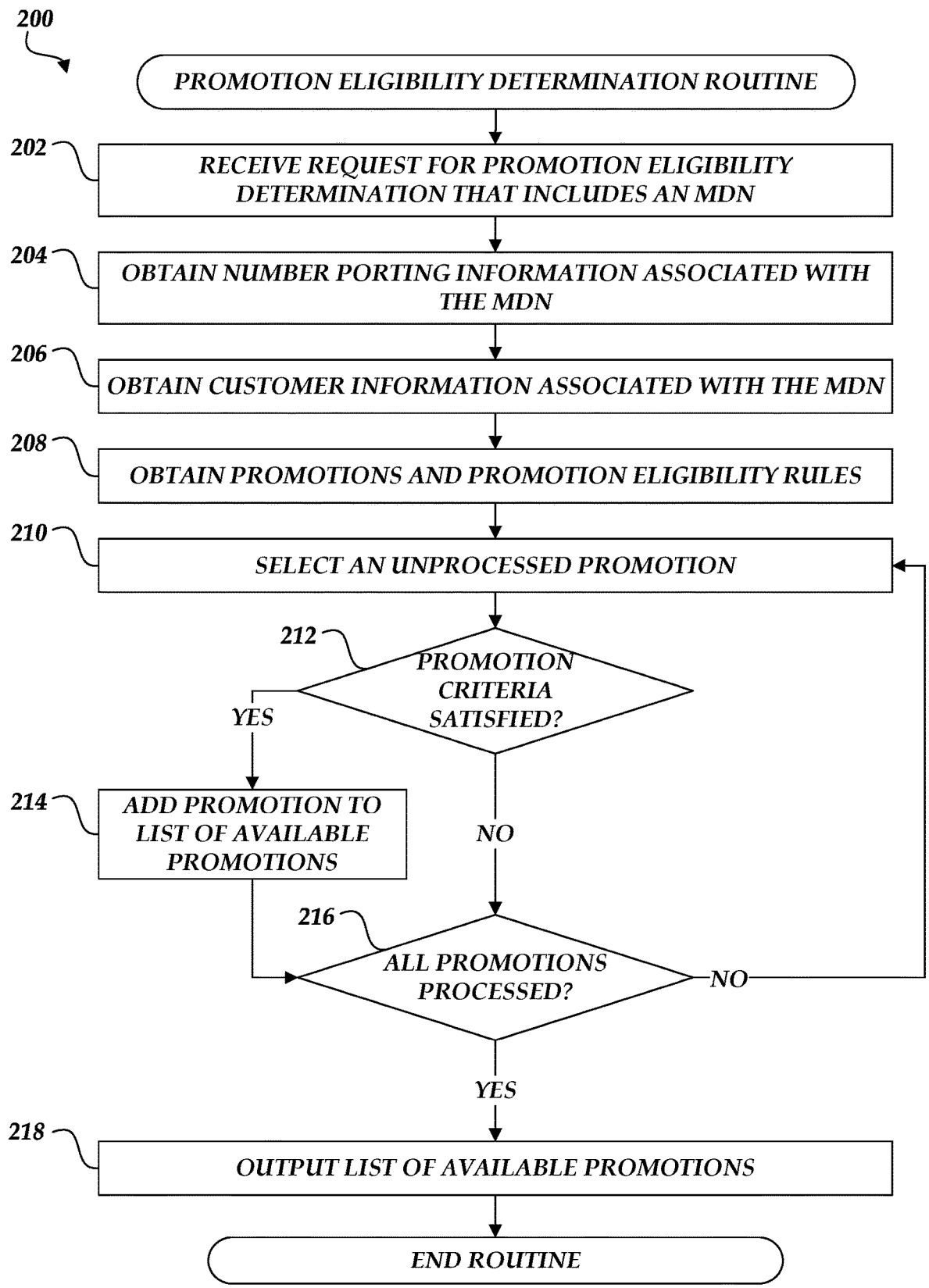
FIG. 2 is a flow diagram depicting an example promotion eligibility determination routine in accordance with aspects of the present disclosure.

FIG. 2 is a flow diagram depicting an example promotion eligibility determination routine 200 that may be implemented in accordance with aspects of the present disclosure. The routine 200 may be implemented, for example, by the promotion eligibility service 330 of FIG. 3, described below. At block 202, a request may be received to identify promotions for which a particular MDN is eligible. In some embodiments, the request may be received from a target computing device, such as the client computing device 310 of FIG. 3. In further embodiments, the request may be to generate a service plan for the specified MDN, and/or to identify promotions or incentives that can be offered in association with the service plan. Example interfaces for obtaining the request for eligibility are illustrated in FIGS. 1A and 1B.

At block 204, number porting information associated with the specified MDN may be obtained. Illustratively, number porting information may be obtained from a data store, such as the number porting data store 336 of FIG. 3. In some embodiments, the information obtained at block 204 may include other service plan processing information, such as information regarding previous service plans associated with the MDN, information regarding the MDN itself (e.g., the wireless service provider to which the MDN was originally allocated), and the like. In other embodiments, number porting information may be obtained for a plurality of MDNs, and the information specific to the specified MDN may be identified. Number porting information may illustratively include an identification of one or more mobile account transfers between wireless service providers. In some embodiments, number porting information may further include dates and/or times at which the MDN was ported. For example, the number porting information may include the date and time of the most recent transfer of the MDN.

At block 206, in some embodiments, transactional information or service plan information, generally referred to as customer information, associated with the MDN may be obtained. Customer information may include, for example, information regarding a current or former customer of the wireless service provider, such as account information for a former customer who had previously ported the MDN to a different wireless service provider. Customer information may be obtained, for example, from the customer information data store 334 of FIG. 3.

At block 208, promotions and promotion eligibility rules may be obtained. Promotions and rules for determining eligibility may be obtained, for example, from the promotion rules data store 332 of FIG. 3. In some embodiments, promotions may be defined in terms of modifications to a service plan, or may be associated with a particular service plan. For example, a promotion may be defined that discounts the standard price for a data usage plan for the first six billing periods. As further examples, a promotion may add unlimited international text messaging to one or more service plans, add 10 GB/month to any service plan that includes data usage caps, and so forth.

Promotions may be illustratively associated with one or more rules specifying conditions that must be satisfied in order to be eligible for the promotion. In some embodiments, a rule may specify time based thresholds that indicate a minimum or maximum amount of time to determine eligibility for a promotion. For example, a rule may specify that an MDN cannot have been ported more than three times within the past year in order to be eligible for the promotion, or that the most recent MDN transfer occurred more than a year ago. In some embodiments, rules may be obtained that specify conditions a user must satisfy in order to accept a promotional offer, such as upgrading to a specified mobile device, subscribing for a specified time period, adding a user, adding a mobile device, upgrading a mobile device, providing additional information regarding the user, scheduling automatic payments or paperless billing, and the like. Additionally, the rules specifying the condition can include multiple thresholds or criteria that may determine different eligible promotions. For example, the wireless service provider may specify a basic promotion for an MDN transfer based on a minimum time since a last transfer. The wireless service provider may specify additional thresholds that have more lucrative or higher value promotions based on a higher amount of time since a last transfer. The promotions may illustratively be cumulative or alternative.

At block 210, one of the promotions obtained at block 208 may be selected. At decision block 212, a determination may be made as to whether the eligibility criteria for the promotion are satisfied. For example, a criterion may specify that the MDN is being ported from a particular wireless service provider, and determination may be that the number porting information associated with the MDN indicates that the criterion is satisfied. As a further example, a set of criteria may specify that the MDN is associated with a former customer, and that the MDN has been ported out within the past 30 days. A determination may thus be made that the MDN does not meet one or more of these criteria.

If the determination at decision block 212 is that the promotion criteria are satisfied, then at block 214 the selected promotion is added to the list of promotions for which the MDN is eligible. Thereafter, or if the determination at decision block 212 is that the criteria are not satisfied, the routine 200 continues at decision block 216, where a determination may be made as to whether all of the promotions obtained at block 208 have been processed. If not, then the routine 200 branches to block 210, where another promotion may be selected, and iterates through blocks 210-216 until all of the promotions have been processed.

The routine 200 then branches to block 218, where the list of promotions for which the MDN is eligible may be output. The output at block 218 may, in some embodiments, include instructions for generating a user interface that contains the list of promotions. In other embodiments, the list of promotions may be transmitted to a target computing device, such as the client computing device 310 of FIG. 3. Illustratively, in addition to the promotions specifically associated with the transfer of the MDN identifier, the list of available promotions can include additional or alternative service plan modifications that can be bundled with a transfer-based promotion or in lieu of transfer-based promotions. For example, block 218 can include, one-time discounts, discounts for a specified number of billing periods, increasing or decreasing an amount of usage in a service plan, adding a user to a service plan, adding a mobile computing device to a service plan, upgrading or replacing a mobile computing device associated with a service plan, increasing or decreasing a bandwidth associated with a service plan, and the like.

In various embodiments, the blocks of routine 200 may be combined, omitted, or carried out in various orders. For example, blocks 204, 206, and 208 may be carried out in any order, or in parallel. As a further example, number porting information for a plurality of MDNs may be obtained prior to the execution of the routine 200, and number porting information associated with a particular MDN may be identified at block 206. The routine 200 is thus understood to be illustrative and not limiting.

Figure 3:
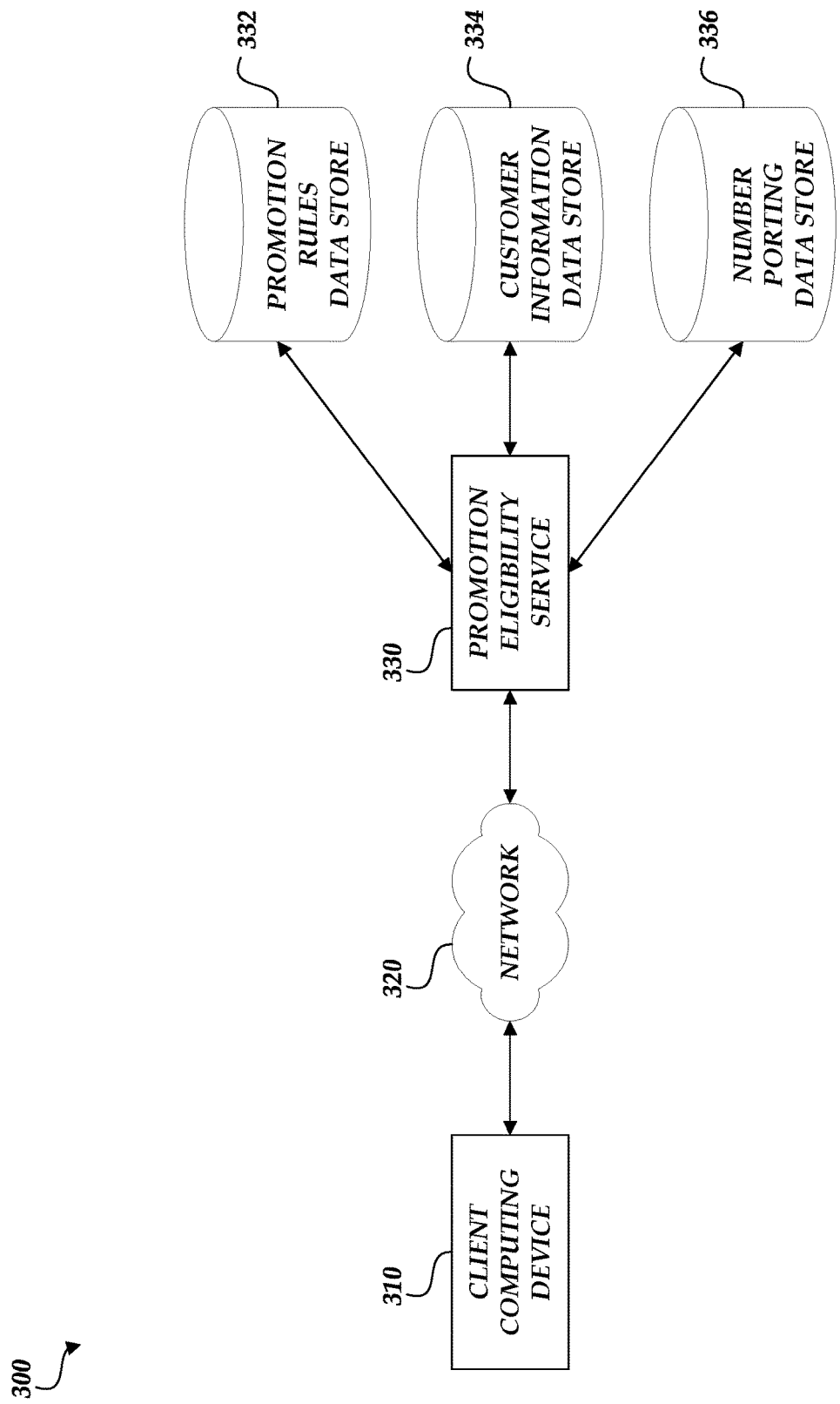
FIG. 3 is a functional block diagram of an example network environment for implementing a promotion eligibility service in accordance with aspects of the present disclosure.

FIG. 3 is a block diagram of an example network environment 300 for implementing a promotion eligibility service in accordance with aspects of the present disclosure. In the illustrated embodiment, a client computing device 310 communicates with the promotion eligibility service 330 via a network 320. The client computing device 310 may illustratively be any computing device that implements aspects of the present disclosure, such as displaying the user interface 100 depicted above. The client computing device 310 may be, for example, a desktop computer, server computer, laptop, tablet, personal digital assistant (PDA), mobile phone, electronic book reader, other wireless handheld device, set-top or other television box, media player, video game platform, kiosk, glasses or other wearable device, point of sale terminal, or any other device with a hardware processor. In some embodiments, the client computing device 310 may be located at a retail store and operated by a retailer. In some embodiments, the client computing device may be omitted or may be combined with the promotion eligibility service 330. The promotion eligibility service 330 is described in more detail below.

The network 320 may illustratively be any wired or wireless network, or combination thereof. In addition, the network 130 may include, but is not limited to, a local area network (LAN), wide area network (WAN), Wi-Fi network, mesh network, cellular telecommunications network, cable network, satellite network, personal area network, public or private intranet, the Internet, any other public or private communications network or networks, or any combination thereof. In some embodiments, the network 320 may be a private or semi-private network, such as a corporate or university intranet. The network 320 may include one or more wireless networks, such as a Global System for Mobile Communications (GSM) network, a Code Division Multiple Access (CDMA) network, a Long Term Evolution (LTE) network, or some other type of wireless network. The network 320 may use protocols and components for communicating via the Internet or any of the other aforementioned types of networks. In some embodiments, the network 320 may be omitted, and the client computing device 310 and the promotion eligibility service 330 may communicate directly with each other. Additionally, in some embodiments, the network 320 may be the wireless telecommunications network provided by the wireless service provider.

In some embodiments, the promotion eligibility service 330 may further communicate with a promotion rules data store 332, customer information data store 334, and number porting data store 336. The data stores 332, 334, and 336 may illustratively be any non-transient computer-readable media, including but not limited to hard drives, solid state devices, flash memories, EEPROMs, or other storage media accessible to or by a device such as an access device, server, or other computing device. In various embodiments, on or more of the data stores 332, 334, and 336 may be implemented as a database, database server, a component of another server or service (e.g., the promotion eligibility service 330), or as more or fewer data stores than are depicted in the example embodiment. For example, the rules data store 332 and the service provider data store 336 may be combined into a single data store. A data store may also or alternatively be distributed or partitioned across multiple local and/or remote storage devices as is known in the art without departing from the scope of the present disclosure. In yet other embodiments, a data store may include or be embodied in a data storage web service. Additionally, in some embodiments, the promotion eligibility service 330 may communicate with one or more of the rules data store 332, customer information data store 334, and service provider data store 336 via the network 320.

It will be understood that the above illustration is provided for purposes of example, and that network environments containing more, fewer, different, or different arrangements of components relative to network environment 300 are within the scope of the present disclosure. For example, the network environment 300 can further include service provider interfaces for obtaining or sharing information, subscriber databases, number portability systems, or other components. The network environment depicted in FIG. 3 is thus understood to be illustrative and not limiting.

Figure 4:
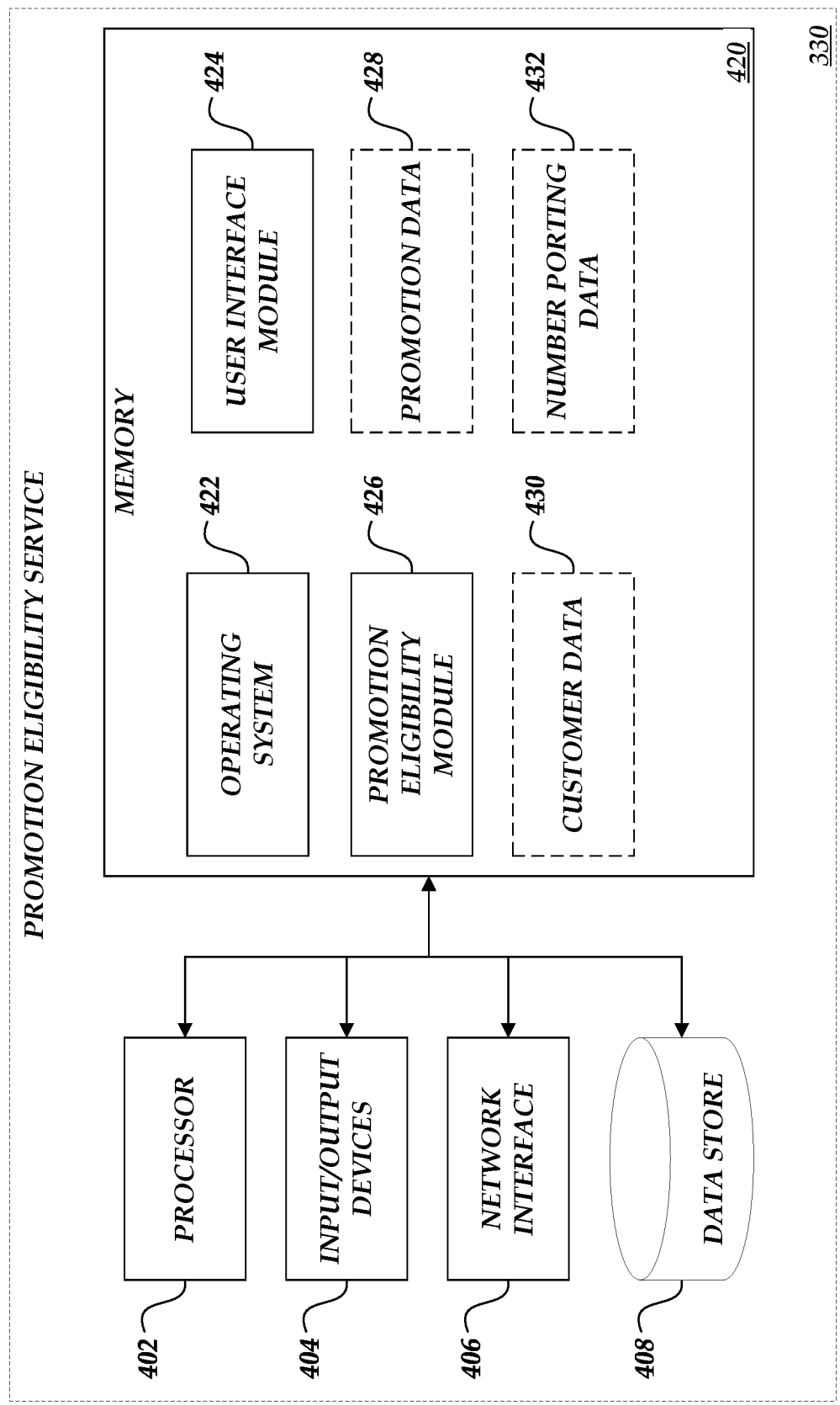
FIG. 4 is a functional block diagram of an example computing device for implementing a promotion eligibility service in the network environment of FIG. 3.

FIG. 4 is an illustrative block diagram depicting a general architecture of a promotion eligibility service 330, which includes an arrangement of computer hardware and software that may be used to implement aspects of the present disclosure. The promotion eligibility service 330 may include more (or fewer) elements than those displayed in FIG. 4. It is not necessary, however, that all of these elements be shown in order to provide an enabling disclosure.

As illustrated, the promotion eligibility service 330 includes a processor 402, input/output devices 404, a network interface 406, and a data store 408, all of which may communicate with one another by way of a communication bus. The input/output devices 404 may include devices for displaying and interacting with user interfaces. The network interface 406 may provide connectivity to one or more networks (such as the network of FIG. 3) or computing systems and, as a result, may enable the customer eligibility service to receive and send information and instructions from and to other computing systems or services. The data store 408 may, in some embodiments, implement the rules data store 332, customer information data store 334, and service provider data store 336 of FIG. 3.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the customer eligibility service. The memory 420 may further store specific computer-executable instructions and other information (which may be referred to herein as "modules") for implementing aspects of the present disclosure.

In some embodiments, the memory 420 may include a user interface module 424, which may be executed by the processor 402 to perform various operations, such as generating and displaying the user interfaces described above. The memory 420 may further include a promotion eligibility module 426, which may carry out, for example, the processing described above. The memory 420 may further include promotion data 428, customer data 430, and number porting data 432, which may be obtained from data stores (e.g., the data stores 332, 334, and 336 of FIG. 3) and processed to determine the eligibility of various customers for various promotions.

While the operating system 422, the user interface module 424 and the promotion eligibility module 426 are illustrated as distinct modules in the memory 420, in some embodiments, the user interface module 424 and promotion eligibility module 426 may be incorporated as modules in the operating system 422 or another application or module, and as such, separate modules may not be required to implement some embodiments. In some embodiments, user interface module 424, the user interface module 424 and promotion eligibility module 426 may be implemented as parts of a single application.

It will be recognized that many of the components described in FIG. 4 are optional and that embodiments of the customer eligibility service may or may not combine components. Furthermore, components need not be distinct or discrete. Components may also be reorganized. For example, the promotion eligibility service 330 may be represented in a single physical device or, alternatively, may be split into multiple physical devices. In some embodiments, components illustrated as part of the promotion eligibility service 330 may additionally or alternatively be included in other computing devices, such that some aspects of the present disclosure may be performed by the promotion eligibility service 330 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
a data store configured to store information regarding one or more users of wireless telecommunications services individually associated with mobile directory numbers and service plan processing information; and
a processor in communication with the data store, wherein the processor executes specific computer-executable instructions that configure the processor to:
receive, from a target computing device, a request to generate a service plan for a specified mobile directory number;
obtain, from the data store, service plan processing information associated with the specified mobile directory number, wherein the service plan processing information identifies one or more transactions associated with at least one of creating or transferring an account with a mobile service provider;
determine, based at least in part on the obtained service plan processing information, eligibility for the account associated with the mobile service provider to be eligible for one or more account incentives to create or transfer the account; and
generate, for the target computing device, a user interface indicative of the determined eligibility, wherein the user interface excludes the service plan processing information.

2. The system of claim 1, wherein the processor is further configured to identify one or more service plan modifications based on processing the service plan processing information, wherein individual service plan modifications are associated with a condition that a user must satisfy in order to accept the modified service plan.

3. The system of claim 2, wherein the condition comprises at least one of upgrading to a specified mobile computing device, subscribing for a specified time period, adding an additional user to the modified service plan, adding a mobile computing device to the modified service plan, providing additional information regarding the user, scheduling automatic payment, or agreeing to receive information electronically.

4. The system of claim 2, wherein the user interface indicative of the determined eligibility includes an identification of at least one service plan modification.

5. A computer-implemented method under control of a processor executing specific computer-executable instructions, the computer-implemented method comprising:
obtaining a modification request to determine eligibility for at least one of creating or transferring a mobile account associated with a mobile directory number;
obtaining historical information regarding transactions associated with transferring the mobile account associated with the mobile directory number;
identifying, based at least in part on the historical information associated with transferring the mobile account associated with the mobile directory number, eligibility for at least one of creating or transferring a mobile account based on a time criteria; and
generating a user interface indicative of the identified eligibility, the user interface omitting the historical information.

6. The computer-implemented method of claim 5, wherein the historical information regarding transactions associated with transferring the mobile account associated with the mobile directory number include an identification one or more mobile account transfers and time information associated with the identified one or more mobile account transfers.

7. The computer-implemented method of claim 5 wherein identifying eligibility for at least one of creating or transferring a mobile account based on time criteria includes determining whether one or more time thresholds have been exceeded.

8. The computer-implemented method of claim 7, wherein individual time thresholds correspond to individual account promotions.

9. The computer-implemented method of claim 7, wherein generating a user interface indicative of the identified eligibility includes generating the user interface identifying at least one individual account promotion based on a determined exceeded time threshold.

10. The computer-implemented method of claim 5, wherein generating the user interface indicative of the identified eligibility includes generating the user interface identifying at least general account promotion based on a determined no exceeded time threshold.

11. The computer-implemented method of claim 5 further comprising identifying one or more service plan modifications based on processing the historical information, wherein individual service plan modifications are associated with a condition that a user must satisfy in order to accept the modified service plan.

12. The computer-implemented method of claim 11, wherein the service plan modification comprises one or more of providing a one-time discount, providing a discount for a specified number of billing periods, increasing or decreasing an amount of usage that is included in the base service plan, adding a user to the base service plan, adding a mobile computing device to the base service plan, upgrading a mobile computing device associated with the base service plan, or increasing or decreasing a bandwidth associated with the base service plan.

13. The computer-implemented method of claim 11, wherein generating the user interface includes identifying one or more service plan modifications.

14. The computer-implemented of claim 5 further comprising causing a prevention of a transfer of a mobile account based on the identified eligibility for at least one of creating or transferring a mobile account based on a time criterion.

15. A non-transient, computer-readable medium containing computer-executable instructions that, when executed by a processor, configure the processor to:
obtain a request for eligibility for at least one of creating or transferring a mobile account associated with a mobile directory number;
determine, based at least in part on transactional information indicative of redemption of mobile account transfer promotions associated with the mobile directory number, eligibility for at least one of creating or transferring a mobile account based on a time criteria; and
generate a user interface indicative of the identified eligibility.

16. The non-transient, computer-readable medium of claim 15, wherein transactional information indicative of redemption of mobile account transfer promotions associated with the mobile directory number includes time information associated with individual redemptions.

17. The non-transient, computer-readable medium of claim 16, wherein the processor is further configured determine eligibility based on comparing the time information associated with the individual redemptions to at least one time threshold.

18. The non-transient, computer-readable medium of claim 16 wherein the processor is further configured determine eligibility based on comparing the time information associated with the individual redemptions to a plurality of time thresholds.

19. The non-transient, computer-readable medium of claim 15, wherein the processor is further configured to generate the user interface without including the transactional information indicative of redemption of mobile account transfer promotions.

20. The non-transient, computer-readable medium of claim 15, wherein the processor is further configured to identify one or more additional service plan modifications.

* * * * *